United States Patent
Jamali (10) Patent No.: US 11,643,503 B2
(45) Date of Patent: May 9, 2023

(54) HIGHLY SPHERICAL POLYAMIDE MICROPARTICLES AND SYNTHESIS METHODS RELATED THERETO

(71) Applicant: Xerox Corporation, Norwalk, CT (US)

(72) Inventor: Hojjat Seyed Jamali, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 361 days.

(21) Appl. No.: 16/925,780

(22) Filed: Jul. 10, 2020

(65) Prior Publication Data

US 2022/0010066 A1 Jan. 13, 2022

(51) Int. Cl.
*C08G 69/46* (2006.01)
*B29B 9/12* (2006.01)

(52) U.S. Cl.
CPC ........ *C08G 69/46* (2013.01); *B29B 2009/125* (2013.01)

(58) Field of Classification Search
CPC ......... C08G 69/02; C08G 69/46; C08L 77/02; B29B 2009/125
See application file for complete search history.

(56) References Cited

U.S. PATENT DOCUMENTS

| 3,909,498 A | 9/1975 | Wolvers et al. | |
| 2005/0079350 A1* | 4/2005 | Highsmith | C08G 69/46 521/32 |

FOREIGN PATENT DOCUMENTS

| EP | 0866088 A1 | 9/1998 |
| EP | 2743290 A1 | 6/2014 |
| EP | 3239214 A1 | 11/2017 |
| WO | 2005105891 A1 | 11/2005 |
| WO | 2019239965 A1 | 12/2019 |

OTHER PUBLICATIONS

Isopar M MSDS, published on Dec. 2015.*
Daniel Crespy and Katharina Landfester; Anionic Polymerization of ε-Caprolactam in Miniemulsion: Synthesis and Characterization of Polyamide-6 Nanoparticles; Macromolecules 2005 38 (16), 6882-6887.
Stephanie Fanselow, Jochen Schmidt, Karl-Ernst Wirth, and Wolfgang Peukert, "Production of micron-sized polymer particles for additive manufacturing by melt emulsification", AIP Conference Proceedings 1713, 140007 (2016).
Jochen Schmidt, Marius Sachs, Stephanie Fanselow, Karl-Ernst Wirth, and Wolfgang Peukert, "New approaches towards production of polymer powders for selective laser beam melting of polymers", AIP Conference Proceedings 1914, 190008 (2017).
European Search Report for corresponding EP Application No. 21181601.2 dated Dec. 3, 2021.

* cited by examiner

*Primary Examiner* — Gregory Listvoyb
(74) *Attorney, Agent, or Firm* — Vorys, Sater, Seymour and Pease LLP (57) ABSTRACT

A method of synthesizing polyamide microparticles may comprise: dehydrating and shearing a mixture comprising a matrix fluid, an emulsion stabilizer at about 0.01 wt % to about 50 wt % based on the weight of the matrix fluid, a solvent at about 13 wt % to about 75 wt % based on the weight of the matrix fluid, and a cyclic amide monomer at about 20 wt % to about 90 wt % based on the weight of the matrix fluid to yield an emulsion having a water content of about 1 wt % or less based on the total weight of the emulsion; adding a deprotonating agent to the emulsion at a concentration of about 0.01 wt % to about 1 wt % based on the weight of the matrix fluid; and contacting the emulsion with a polymerization initiator under conditions effective to polymerize the cyclic amide monomer into a plurality of polyamide microparticles.

19 Claims, 4 Drawing Sheets

HIGHLY SPHERICAL POLYAMIDE MICROPARTICLES AND SYNTHESIS METHODS RELATED THERETO

FIELD

The present disclosure relates to thermoplastic polyamide microparticles and methods of making such microparticles. Such microparticles, especially the highly spherical thermoplastic polyamide microparticles, may be useful, among other things, as starting material for additive manufacturing.

BACKGROUND

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS). Incomplete interlayer fusion may result in structural weak points, which may be problematic for printing objects having exacting structural and mechanical tolerances.

Powder particulates usable in 3-D printing include thermoplastic polymers, including thermoplastic elastomers, metals and other solidifiable substances. Although a wide array of thermoplastic polymers are known, there are relatively few having properties suitable for use in 3-D printing, particularly when using powder bed fusion (PBF). Additive manufacturing methods using powdered materials include PBF, selective laser sintering (SLS), selective heat sintering (SHM), selective laser melting (SLM), electron beam melting (EBM), binder jetting, and multi jet fusion (MJF). In the SLS printing method, the particles are fused together by the energy from a high-powered laser. Typical thermoplastic polymers suitable for use in 3-D printing include those having sharp melting points and recrystallization points about 20° C. to 50° C. below the melting point. This difference may allow more effective coalescence between adjacent polymer layers to take place, thereby promoting improved structural and mechanical integrity.

For good printing performance to be realized using powder particulates, particularly polymer powder particulates, the powder particulates need to maintain good flow properties in the solid state. Flow properties may be evaluated, for example, by measuring the fraction of powder particulates from a sample that are able to pass through a standard sieve of a specified size and/or measuring of the angle of repose. High fractions of sievable powder particulates may be indicative of the particulates existing as non-agglomerated, substantially individual particulates, which may be characteristic of ready powder flow. Lower values of the angle of repose also may be characteristic of ready powder flow. A relatively narrow particle size distribution and regularity of the particulate shape in a sample may also aid in promoting good powder flow performance.

Commercial powder particulates are oftentimes obtained by cryogenic grinding or precipitation processes, which may result in irregular particulate shapes and wide particle size distributions. Irregular particulate shapes may result in poor powder flow performance during 3-D printing processes. In addition, powder particulates having shape irregularity, especially those obtained from current commercial processes, may afford poor packing efficiency following deposition and consolidation, thereby resulting in extensive void formation in a printed object due to the powder particulates not packing closely together during deposition. Wide particle size distributions may be similarly problematic in this regard. Although poor powder flow performance may be addressed to some degree through dry blending with fillers and flow aids, these techniques may have limited effectiveness with softer polymer materials, such as elastomers, due to particulate aggregation.

SUMMARY

The present disclosure relates to thermoplastic polyamide microparticles and methods of making such microparticles. Such microparticles, especially the highly spherical thermoplastic polyamide microparticles, may be useful, among other things, as starting material for additive manufacturing.

According to aspects illustrated herein, there is provided methods of synthesizing polyamide microparticles comprising: dehydrating and shearing a mixture comprising a matrix fluid, an emulsion stabilizer at about 0.01 wt % to about 50 wt % based on the weight of the matrix fluid, a solvent at about 13 wt % to about 75 wt % based on the weight of the matrix fluid, and a cyclic amide monomer at about 20 wt % to about 90 wt % based on the weight of the matrix fluid to yield an emulsion having a water content of about 1 wt % or less based on the total weight of the emulsion; adding a deprotonating agent to the emulsion at a concentration of about 0.01 wt % to about 1 wt % based on the weight of the matrix fluid; and contacting the emulsion with a polymerization initiator under conditions effective to polymerize the cyclic amide monomer into a plurality of polyamide microparticles.

According to aspects illustrated herein, there is provided methods of synthesizing polyamide microparticles comprising: dehydrating and shearing a mixture comprising a matrix fluid, an emulsion stabilizer at about 0.01 wt % to about 50 wt % based on the weight of the matrix fluid, and a solvent at about 13 wt % to about 75 wt % based on the weight of the matrix fluid; adding while shearing a cyclic amide monomer at about 20 wt % to about 90 wt % based on the weight of the matrix fluid to the mixture to yield an emulsion; dehydrating the emulsion to a water content of about 1 wt % or less based on the total weight of the emulsion to yield a dehydrated emulsion; adding a deprotonating agent to the dehydrated emulsion at a concentration of about 0.01 wt % to about 1 wt % based on the weight of the matrix fluid; and contacting the dehydrated emulsion with a polymerization initiator under conditions effective to polymerize the cyclic amide monomer into a plurality of polyamide microparticles.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

The present disclosure relates to thermoplastic polyamide microparticles and methods of making such microparticles. Such microparticles, especially the highly spherical thermoplastic polyamide microparticles, may be useful, among other things, as starting material for additive manufacturing.

More specifically, the thermoplastic polyamide microparticles described herein are produced by an oil-in-oil melt emulsion ring opening polymerization of a cyclic amide in the presence of a deprotonating agent resulting in highly spherical polyamide microparticles with good flow properties.

Further, emulsion stabilizers used in some of the synthesis methods described herein may advantageously associate with an outer surface of the polyamide microparticles. Such emulsion stabilizers may act as flow aids that further enhance the flow properties of the polyamide microparticles described herein.

Definitions and Test Methods

As used herein, the term "miscible" refers to a mixture of components that, when combined, form a single fluid phase.

As used herein, the term "thermoplastic" refers to a material that softens and hardens reversibly on heating and cooling.

As used herein, the term "oxide" refers to both metal oxides and non-metal oxides. For purposes of the present disclosure, silicon is considered to be a metal.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherences via hydrogen bonding and/or other mechanisms. However, chemical bonding may be occurring to some degree.

As used herein, the term "embed" relative to nanoparticles and a surface of a polymer particle refers to the nanoparticle being at least partially extending into the surface such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter at which 10% of the sample (on a volume basis, unless otherwise specified) is comprised of particles having a diameter less than said diameter value. As used herein, the term "D50" refers to a diameter at which 50% of the sample (on a volume basis, unless otherwise specified) is comprised of particles having a diameter less than said diameter value. As used herein, the term "D90" refers to a diameter at which 90% of the sample (on a volume basis, unless otherwise specified) is comprised of particles having a diameter less than said diameter value.

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 µm to 150 µm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instruments software from a plot of volume density as a function of size.

Particle size measurement and diameter span can also be determined by optical digital microscopy. The optical images are obtained using a Keyence VHX-2000 digital microscope using version 2.3.5.1 software for particle size analysis (system version 1.93).

As used herein, when referring to sieving, pore/screen sizes are described per U.S.A. Standard Sieve (ASTM E11-17).

As used herein, the terms "circularity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50-gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

Thermoplastic Polyamide Microparticles and Methods of Making

The present disclosure relates to thermoplastic polyamide microparticles and methods of producing such particles using an oil-in-oil melt emulsion ring opening polymerization.

Figure 1:
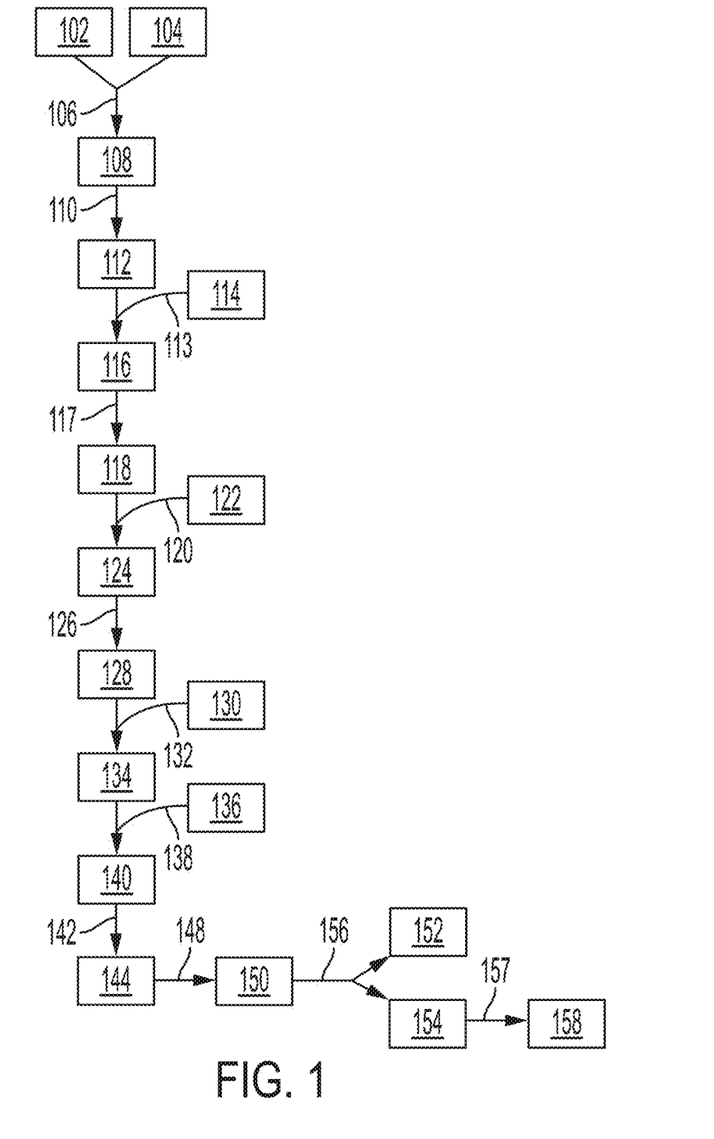
FIG. 1 is a flow chart of a nonlimiting example method of the present disclosure.

FIG. 1 is a flow chart of a nonlimiting example method 100 of the present disclosure. A matrix fluid 102 and emulsion stabilizers 104 are combined 106 to produce a mixture 108. Mixing and/or heating may be included during the process of combining 106 the matrix fluid 102 and the emulsion stabilizers 104. Combining 106 the matrix fluid 102 and the emulsion stabilizers 104 can occur in any suitable mixing apparatus.

Examples of matrix fluids 102 include, but are not limited to, polysiloxanes modified with fatty acids, polysiloxanes modified with fatty alcohols, polysiloxanes modified with polyoxy alkylenes, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, silicone oil, fluorinated silicone oils, perfluorinated silicone oils, polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, and fatty alcohols, and the like, and any combination thereof.

The matrix fluid 102 may have a viscosity at 25° C. of about 50 cSt to about 500,000 cSt (or about 50 cSt to about 5,000 cSt, or about 1,000 cSt to about 60,000 cSt, or about 40,000 cSt to about 100,000 cSt, or about 75,000 cSt to about 150,000 cSt, or about 100,000 cSt to about 300,000 cSt, or about 250,000 cSt to about 500,000 cSt).

Emulsion stabilizers may comprise nanoparticles (e.g., oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 $m^2/g$), AEROSIL® RX50 (about 40 nm average diameter silica nanoparticles having a hydrophobically modified surface and a BET surface area of 35±10 $m^2/g$), AEROSIL® 380 (silica nanoparticles having a hydrophilically-modified surface and a BET surface area of 380±30 $m^2/g$), and the like, and any combination thereof).

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 $m^2/g$ to about 500 $m^2/g$ (or about 10 $m^2/g$ to about 150 $m^2/g$, or about 25 $m^2/g$ to about 100 $m^2/g$, or about 100 $m^2/g$ to about 250 $m^2/g$, or about 250 $m^2/g$ to about 500 $m^2/g$).

Surfactants may be anionic, cationic, nonionic, or zwitterionic chemicals. Examples of surfactants include, but are not limited to, sorbitan oleates, poly[dimethylsiloxane]-co-[3-(2-(2-hydroxyethoxy)ethoxy)propylmethylsiloxane], sulfates (e.g., sodium dodecyl sulfate and sodium dodecyinaphthalene sulfate), sulfonates (e.g., docusate sodium (sodium 1,4-bis(2-ethylhexoxy)-1,4-dioxobutane-2-sulfonate) and sodium dodecylbenzene sulfonate), dialkyl benzenealkyl sulfates, dialkyl benzenealkyl sulfonates, acids (e.g., abitic acid available from Aldrich, NEOGEN R™ and NEOGEN SC™ available from Daiichi Kogyo Seiyaku), alcohols (e.g., polyvinyl alcohol and dialkylphenoxy poly(ethyleneoxy) ethanol), acids (e.g., polyacrylic acid,), ethers (e.g., polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether), methalose, methyl cellulose, ethyl cellulose, propyl cellulose, hydroxyl ethyl cellulose, carboxy methyl cellulose, ammoniums (e.g., alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride), C12 trimethyl ammonium bromide, C15 trimethyl ammonium bromide, C17 trimethyl ammonium bromide, cetyl pyridinium bromide, halide salts of quaternized polyoxyethylalkylamines, dodecylbenzyl triethyl ammonium chloride, and the like, and any mixture thereof. Commercially available examples of surfactants include, but are not limited to, CALFAX™ DB-45 (sodium dodecyl diphenyl oxide di sulfonate, available from Pilot Chemicals), SPAN™ 80 (sorbitan maleate non-ionic surfactant), MERPOL™ surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL™ CA-360 (polyoxyethylene (9) nonyphenylether, available from SigmaAldrich), BRIJ™ S10 (polyethylene glycol octadecyl ether, available from SigmaAldrich), IGEPAL CA-210™ (polyoxyethylene (2) isooctylphenyl ether, available from SigmaAldrich), IGEPAL CA-520™ (polyoxyethylene (5) isooctylphenyl ether, available from SigmaAldrich), IGEPAL CA-720™

(polyoxyethylene (12) isooctylphenyl ether, available from SigmaAldrich), IGEPAL CO-890™ (Polyoxyethylene (40) nonylphenyl ether, branched, available from SigmaAldrich), IGEPAL CO-720™ (polyoxyethylene (12) nonylphenyl ether, branched, available from SigmaAldrich), IGEPAL CO-290™ (alkyl phenoxy poly(ethyleneoxy)ethanol, available from SigmaAldrich), IGEPAL CA-210™ (polyoxyethylene (2) nonylphenyl ether, branched, available from SigmaAldrich), ANTAROX890™ (dialkylphenoxypoly (ethyleneoxy) ethanol, available from Rhone-Poulenc), ANTAROX897™ (dialkylphenoxypoly(ethyleneoxy) ethanol, available from Rhone-Poulenc), and the like, and any combination thereof. The choice of a particular surfactant or combination of surfactants, as well as the amounts of each to be used, are within the purview of those skilled in the art.

Emulsion stabilizers may be included in the mixture 108 at a concentration of about 0.01 wt % to about 50 wt % (or about 0.01 wt % to about 10 wt %, or about 1 wt % to about 20 wt %, or about 10 wt % to about 30 wt %, or about 25 wt % to about 50 wt %) based on the weight of the matrix fluid 102.

The mixture 108 is then dehydrated 110 to remove the majority, if not all, of the water present, thereby forming a first dehydrated mixture 112. Dehydration 110 may be carried out, for example, through heating mixture 108 at a pressure (e.g., about 1 Pa to about 150 Pa, or about 1 Pa to about 10 Pa, or about 5 Pa to about 50 Pa, or about 25 Pa to about 100 Pa, or about 75 Pa to about 150 Pa) and temperature (e.g., about 100° C. or greater, about 100° C. to about 300° C., or about 150° C. or about 250° C.) suitable for evaporating water and below the decomposition temperature of the matrix fluid 102 (preferably below the boiling point of the matrix fluid 102). Mixture 108 may also subjected to shear conditions for mixing (e.g., stirring), for example, at a speed of about 200 RPM (rotations per minute) to 300 RPM.

A solvent 114 is then added 113 to the dehydrated mixture 112, thereby forming a mixture 116. The solvent 114 may be any solvent or mixtures of solvents miscible with matrix fluid 102 and have a boiling point of at least 150° C. (or about 150° C. to about 250° C., or about 165° C. to about 200° C.). Examples of solvents include, but are not limited to, decahydronaphthalene, bicyclohexane, phenylcyclohexane, butylcyclohexane, propylbenzene, butylbenzene, pentylbenzene, hexylbenzene, heptylbenzene, 1-phenyl-1-cyclohexene, 3-cyclohexen-1-ylbenzene, decane, dodecane, tridecane, tetradecane, pentadecane, heptadecane, hexadecane, propylcyclohexane, 4-phenyl-1-cyclohexene, 1-phenyloctane, Octanophenone, 1-phenylnonane, 1-phenyldecane, 1-phenylundecane, 1-phenyldodecane, 1-phenyltridecane, 1-phenyltetradecane, 1-phenylheptadecane, 1-phenyloctadecane, 1,4-didodecylbenzene, 1,4-bis(2-ethylhexyl)benzene, eicosane, triacontane, and the like, and any combination thereof. A nonlimiting example of a commercially available solvents is DECALIN™ (decahydronaphthalene, available from SigmaAldrich). The solvent 114 may be added 113 to dehydrated mixture 112 at a weight percent (based on the weight of the matrix fluid 102) of about 15 wt % to about 75 wt % (or about 15 wt % to about 40 wt %, or about 30 wt % to about 55 wt %, or about 50 wt % to about 75 wt %).

Mixture 116 may then be dehydrated 117 to remove the majority, if not all, of the water present, thereby forming a second dehydrated mixture 118. Dehydration 117 may be carried out, for example, through heating the mixture 116 at a pressure (e.g., about 1 Pa to about 150 Pa, or about 1 Pa to about 10 Pa, or about 5 Pa to about 50 Pa, or about 25 Pa to about 100 Pa, or about 75 Pa to about 150 Pa) and temperature (e.g., about 100° C. or greater, about 100° C. to about 300° C., or about 150° C. or about 200° C.) suitable for evaporating a portion of the solvent (e.g., about 10% to about 15% of the solvent).

While this nonlimiting example method 100 illustrates two dehydration steps, one skilled in the art will recognize that other methods can be used to achieve the second dehydrated mixture 118. Preferably, the second dehydrated mixture 118 comprises a matrix fluid 102, emulsion stabilizers 104 at about 0.01 wt % to about 50 wt % (or about 0.01 wt % to about 10 wt %, 1 wt % to about 20 wt %, or about 10 wt % to about 30 wt %, or about 25 wt % to about 50 wt %) based on the weight of the matrix fluid 102, and a solvent 114 at about 13 wt % to about 75 wt % (or about 13 wt % to 40 wt %, or about 25 wt % to 55 wt %, or about 50 wt % to 75 wt %) based on the weight of the matrix fluid 102. Also, the second dehydrated mixture 118 preferably has a water content of about 1 wt % or less (or 0 wt % to about 1 wt %, or 0 wt % to about 0.1 wt %, or about 0.01 wt % to about 0.1 wt %) based on the total weight of the second dehydrated mixture 118.

Cyclic amide monomer 122 is then added 120 to the second dehydrated mixture 118 forming emulsion 124. Preferably, during adding 120 the cyclic amide monomer 122 to the second dehydrated mixture 118, the second dehydrated mixture 118 is being sheared (preferably under high shear conditions) to facilitate formation of the emulsion 124.

Examples of cyclic amide monomers 122 include, but are not limited to, azeridinone, 2-azetidinone, 2-pyrrolidinone, 2-piperidinone, ε-caprolactam, 2-azacyclooctanone, 2-azacyclononanone, 2-azacyclodecanone, 2-azacycloundecanone, 2-aza-cyclododecanone, laurolactam, and the like, and any combination thereof. The cyclic amide monomer 122 is preferably a cyclic amide monomer suitable for producing nylon 12, nylon 6, or a copolymer thereof.

The cyclic amide monomer 122 in total may be present at about 20 wt % to about 90 wt % (or about 20 wt % to 50 wt %, or about 30 wt % to 75 wt %, or about 50 wt % to 90 wt %) based on the weight of the matrix fluid 102.

The emulsion 124 is then dehydrated 126 at a pressure (e.g., about 1 Pa to about 150 Pa, or about 1 Pa to about 10 Pa, or about 5 Pa to about 50 Pa, or about 25 Pa to about 100 Pa, or about 75 Pa to about 150 Pa) and temperature (e.g., about 100° C. or greater, about 100° C. to about 300° C., or about 150° C. to about 250° C.) sufficient to distill off the majority, if not all, of the water introduced by adding 120 the cyclic amide monomer 122 under high shear conditions, thereby generating a dehydrated emulsion 128. For example, the emulsion 124 may be stirred at a speed of between about 550 RPM and 600 RPM and maintained at a temperature of about 130° C. to about 175° C. (or about 140° C. to about 170° C., or about 150° C. to about 160° C.).

While this nonlimiting example method 100 illustrates several dehydration steps, one skilled in the art will recognize that other methods can be used to achieve the emulsion 124. Preferably, the emulsion 124 comprises a matrix fluid 102, emulsion stabilizers 104 at about 0.01 wt % to about 50 wt % (or about 0.01 wt % to about 10 wt %, or about 1 wt % to about 20 wt %, or about 10 wt % to about 30 wt %, or about 25 wt % to about 50 wt %) based on the weight of the matrix fluid 102, a solvent 114 at about 13 wt % to about 75 wt % (or about 13 wt % to 40 wt %, or about 25 wt % to 55 wt %, or about 50 wt % to 75 wt %) based on the weight of the matrix fluid 102, and a cyclic amide monomer 122 at about 20 wt % to about 90 wt % (or about 20 wt % to 50 wt %, or about 30 wt % to 75 wt %, or about 50 wt % to 90 wt %) based on the weight of the matrix fluid 102. Also, the emulsion 124 preferably has a water content of about 1 wt % or less (or 0 wt % to about 1 wt %, or 0 wt % to about 0.1 wt %, or about 0.01 wt % to about 0.1 wt %) based on the total weight of the emulsion 124.

A deprotonating agent 130 may then be added 132 to the dehydrated emulsion 128 under the high shear conditions and dehydrating conditions. Without being limited by theory, it is believed that the deprotonating agent 130 deprotonates the cyclic amide monomer. For example, dodecane-12-lactam may be deprotonated with sodium hydroxide according to Scheme I below:

Examples of deprotonating agent 130 include, but are not limited to, Group I and Group II metal hydroxides and hydrides (e.g., NaOH, NaH, KOH, LiH, LiOH), potassium methoxide, sodium methoxide, potassium ethoxide, sodium ethoxide, lithium ethoxide, potassium t-butoxide, sodium t-butoxide, lithium t-butoxide, sodium caprolactamates (e.g., BRUGGOLEN™ C10 available from Bruggemann Chemical and ADDONYL™ CR CATALYZE and ADDONYL™ Kat NL available from Rhein Chemie), ε-caprolactam magnesium bromides (e.g., NYRIM™ C1 available from Bruggemann Chemicals), sodium dicaprolactamato-bi s-(2-methoxyethoxo)-aluminate (e.g., DILACTAMATE™ available from Katchem), and the like, and any combination thereof. A deprotonating agent 130 may be added to the emulsion 124 at a concentration of about 0.01 wt % to about 1 wt % (or about 0.01 wt % to about 0.5 wt %, or about 0.05 wt % to about 0.5 wt %, or about 0.05 wt % to about 0.1 wt %, or about 0.1 wt % to about 0.5 wt %) based on the weight of the matrix fluid 102.

The resulting emulsion 134 is preferably then exposed to an inert gas (e.g., Group 18 gas or nitrogen or mixtures thereof) to bring the pressure up to atmospheric pressure while avoiding water contamination. While it is preferable to perform the next steps of the reaction at atmospheric pressure, the steps may be performed at a reduced pressure or an increased pressure each relative to atmospheric pressure.

A polymerization initiator 136 is then added 138 to emulsion 134 thereby forming mixture 140, which is processed 142 under sufficient temperature and shear conditions to maintain the emulsion stability and avoid water contamination while promoting polymerization of the cyclic amide monomers.

Examples of polymerization initiators include, but are not limited to, a diisocyanate (e.g., toluene diisocyanate (TDI) and methylene diphenyl diisocyate (MDI)), N-acetyl-ε-caprolactams, diisocyanate derivatives, N-carbamoyllactams, hexamethylene-1,6-dicarbamoylcaprolactam (e.g., BRUGGOLEN™ C20 available from Bruggemann Chemicals), polyisocyanates (e.g., ADDONYL™ ACTIVATE, ADDONYL™ 8101, ADDONYL™ TT, and ADDONYL™ P available from Rhein Chemie and GRILONIT LA available from Ems Chemie), polycarbodiimides, N,N'-alkylene bisamides (e.g., N,N'-ethylene-bisstearamide), and the like, and any combination thereof. A melt emulsion 144 comprising droplets of polymerized cyclic amide monomers ("polyamide") is thereby formed.

When describing polymerization of the cyclic monomers herein, the individual cyclic monomers may be in a deprotonated form or the protonated form, and both forms may be present simultaneously in the mixture. The term cyclic monomer is not considered limiting to a specific form or relative concentrations of each form.

While FIG. 1 adds the deprotonating agent 130 to the emulsion before the polymerization initiator 136, methods described herein can include (a) adding the deprotonating agent to the emulsion after the polymerization initiator or (b) adding the deprotonating agent and the polymerization initiator simultaneously to the emulsion.

In general, the temperature of processing 142 the melt emulsion 144 should be a temperature greater than the melting point or softening temperature of the polyamide being generated and less than the decomposition temperature of any components in the melt emulsion 144. For example, the temperature of processing 142 and forming the melt emulsion 144 may be about 150° C. to about 170° C. (or about 150° C. to about 160° C., or about 155° C. to about 170° C., or about 160° C. to about 170° C.) greater than the melting point or softening temperature of the polyamide being generated provided the temperature of processing 142 the melt emulsion 144 is less than the decomposition temperature of any components in the melt emulsion 144.

The shear rate of processing 142 and forming the melt emulsion 144 should be sufficiently high to disperse the polyamide as droplets. Said droplets should comprise droplets having a diameter of about 1000 μm or less (or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm). High shear conditions may comprise stirring the mixture 140, for example, at a speed of between about 575 RPM and 625 RPM.

The time for maintaining said temperature and shear rate for processing 142 and forming the melt emulsion 144 may be about 10 seconds to about 18 hours or longer (or about 10 seconds to about 30 minutes, or about 5 minutes to about 1 hour, or about 15 minutes to about 2 hours, or about 1 hour to about 6 hours, or about 3 hours to about 18 hours). Without being limited by theory, it is believed that a steady state of droplet sizes will be reached at which point processing 142 can be stopped. That time may depend on, among other things, the temperature, shear rate, the droplet composition, the solvent 114 composition, and the emulsion stabilizers 104 composition.

The mixing apparatuses used for the processing 142 to produce the melt emulsion 144 should be capable of maintaining the melt emulsion 144 at a temperature greater than the melting point or softening temperature of the polyamide being generated and applying a shear rate sufficient to maintain the dispersement of polyamide droplets in the melt emulsion 144. Examples of mixing apparatuses used for the processing 142 to produce the melt emulsion 144 include, but are not limited to, extruders (e.g., continuous extruders, batch extruders, and the like), stirred reactors, blenders, reactors with inline homogenizer systems, and the like, and apparatuses derived therefrom.

The melt emulsion 144 may then be cooled 148. Cooling 148 can be slow (e.g., allowing the melt emulsion to cool under ambient conditions) to fast (e.g., quenching). For example, the rate of cooling may range from about 10° C./hour to about 100° C./second or almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 144. In some instances, the shear applied during heating may be applied during cooling.

The cooled mixture 150 resulting from cooling 148 the melt emulsion 144 comprises solidified polyamide microparticles and other components (e.g., solvent 110, excess emulsion stabilizer 104, matrix fluid 102, and the like). The polyamide microparticles may be dispersed in or settled in the matrix fluid/solvent/emulsion stabilizer mixture.

The particular composition of a polyamide microparticle depends, among other things, on the cyclic amide monomer 122 added 120 to the second dehydrated mixture 118. Examples of polyamides that may be prepared by the methods disclosed herein include polyamide 12 (Nylon 12) in embodiments where the cyclic amide comprises poly (dodecane-12-lactam) and polyamide 6 (Nylon 6) in embodiments where the cyclic amide comprises poly (hexane-6-lactam). Where both poly(dodecane-12-lactam) and poly(hexane-6-lactam) are present, a copolyamide 6/12 may be produced.

Other polyamides that may be formed include poly(hexamethylene succinimide) (nylon 46, polyamide 46, or PA46), polyhexamethylene adipamide (nylon 66, polyamide 66, or PA66), polypentamethylene adipamide (nylon 56, polyamide 56, or PA56), polyhexamethylene sebacamide (nylon 610, polyamide 610, or PA610), polyundecaamide (nylon 11, polyamide 11, or PA11), and polyhexamethylene terephthalamide (nylon 6T, polyamide 6T, or PA6T), nylon 10.10 (polyamide 10.10 or PA10.10), nylon 10.12 (polyamide 10.12 or PA10.12), nylon 10.14 (polyamide 10.14 or PA10.14), nylon 10.18 (polyamide 10.18 or PA10.18), nylon 6.10 (polyamide 6.10 or PA6.10), nylon 6.18 (polyamide 6.18 or PA6.18), nylon 6.12 (polyamide 6.12 or PA6.12), nylon 6.14 (polyamide 6.14 or PA6.14), semi-aromatic polyamide, and the like, and any combination thereof. Copolyamides may also be used. Examples of copolyamides include, but are not limited to, PA 11/10.10, PA 6/11, PA 11/12, PA 10.10/10.12, PA 10.10/10.14, PA 11/10.36, PA 11/6.36, PA 10.10/10.36, and the like, and any combination thereof. Examples of polyamides include, but are not limited to, polycaproamide (nylon 6, polyamide 6, or PA6), poly(hexamethylene succinamide) (nylon 46, polyamide 46, or PA46), polyhexamethylene adipamide (nylon 66, polyamide 66, or PA66), polypentamethylene adipamide (nylon 56, polyamide 56, or PA56), polyhexamethylene sebacamide (nylon 610, polyamide 610, or PA610), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10.10 (polyamide 10.10 or PA10.10), nylon 10.12 (polyamide 10.12 or PA10.12), nylon 10.14 (polyamide 10.14 or PA10.14), nylon 10.18 (polyamide 10.18 or PA10.18), nylon 6.10 (polyamide 6.10 or PA6.10), nylon 6.18 (polyamide 6.18 or PA6.18), nylon 6.12 (polyamide 6.12 or PA6.12), nylon 6.14 (polyamide 6.14 or PA6.14), semi-aromatic polyamide, and the like, and any combination thereof. Copolyamides may also be used. Examples of copolyamides include, but are not limited to, PA 11/10.10, PA 6/11, PA 6.6/6, PA 11/12, PA 10.10/10.12, PA 10.10/ 10.14, PA 11/10.36, PA 11/6.36, PA 10.10/10.36, and the like, and any combination thereof. Examples of polyamide elastomers include, but are not limited to, polyesteramide, polyetheresteramide, polycarbonate-esteramide, and polyether-block-amide elastomers.

The cooled mixture 150 may then be treated 156 to the separate polyamide microparticles 152 from the other components 154. Suitable treatments include, but are not limited to, washing, filtering, centrifuging, decanting, and the like, and any combination thereof. Solvents used for washing polyamide microparticles 152 should generally be (a) miscible with matrix fluid and solvent and (b) nonreactive (e.g., non-swelling and non-dissolving) with the polyamide. The choice of washing solvent will depend on, among other things, the composition of the matrix fluid and the composition of the polyamide microparticles 152. For example, polyamide microparticles 152 may be washed with one or more of n-heptane, n-hexane, ethyl acetate, and methanol.

The solvents and other remaining components may be removed from polyamide microparticles 152 by drying using an appropriate method such as air-drying, heat-drying, reduced pressure drying, freeze-drying, or a hybrid thereof. The heating may be performed preferably at a temperature lower than the glass transition point of the thermoplastic polymer (e.g., about 50° C. to about 150° C.).

Polyamide microparticles 152, after separation from the other components 154, may optionally be further classified 157 (or filtered by size) to produce purified polyamide microparticles 158. For example, to narrow the particle size distribution (or reduce the diameter span), the polyamide microparticles 152 can be passed through a sieve having a pore size of about 10 μm to about 250 μm (or about 10 μm to about 100 μm, or about 50 μm to about 200 μm, or about 150 μm to about 250 μm).

In another example purification technique, the polyamide microparticles 152 may be washed with water to remove at least some of the emulsion stabilizers (e.g., surfactant). In yet another example purification technique, the polyamide microparticles 152 may be blended with additives to achieve a desired final product. Examples of such additives include flow aids (e.g., nanoparticle silica, carbon black, or PTFE particles), other polymer particles, fillers, and the like, and any combination thereof.

In some instances, emulsion stabilizers used in making the polyamide microparticles 152 may be unwanted in downstream applications. Accordingly, yet another example purification technique may include at least substantial removal of the emulsion stabilizers from the polyamide microparticles 152 (e.g., by washing and/or pyrolysis).

In some instances, the emulsion stabilizers may be useful as flow aids (e.g., nanoparticle silica, carbon black, or PTFE particles).

Polyamide microparticles 152 and/or purified polyamide microparticles 158 (referred to as particles 152/158) may be characterized by composition, physical structure, and the like.

Polyamide may be present in the microparticles 152/158 at about 90 wt % to about 99.5 wt % (or about 90 wt % to about 95 wt %, or about 92 wt % to about 97 wt %, or about 95 wt % to about 99.5 wt %) of the polyamide microparticles 152/158.

As described above, the emulsion stabilizers are at the interface between the polyamide droplet and surrounding liquid mixture. As a result, when the mixture is cooled, emulsion stabilizers remain at, or in the vicinity of, said interface. As a result, polyamide microparticles 152/158 may comprise emulsion stabilizers associated with an outer surface of the particles 152/158 as (a) dispersed on the outer surface of the particles 152/158 as a coating and/or (b) embedded in the outer portion (e.g., outer 1 vol %) of the particles 152/158.

The coating may be disposed substantially uniformly upon the outer surface. As used herein with respect to a coating, the term "substantially uniform" refers to even coating thickness in surface locations covered by the coating composition (e.g., the emulsion stabilizers), particularly the entirety of the outer surface. The emulsion stabilizers 104 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the polyamide microparticles 152/158. When purified to at least substantially remove emulsion stabilizers, the emulsion stabilizers 104 may be present in the polyamide microparticles 158 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the polyamide microparticles 158. The coverage of the emulsion stabilizers 104 on an outer surface of the polyamide microparticles 152/158 may be determined using image analysis of the SEM micrographs. The emulsion stabilizers 104 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the polyamide microparticles 152/158. When purified to at least substantially remove emulsion stabilizers, the emulsion stabilizers 104 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 104 on an outer surface of the polyamide microparticles 152/158 may be determined using image analysis of the SEM micrographs Further, where voids form inside the polyamide microparticle, emulsion stabilizers 104 may be present at the interface between the interior of the void and the polyamide microparticle. The voids generally do not contain the polyamide material. Rather, the voids may contain, for example, solvent (e.g., solvent 114, washing solvent), air, or be void. The particles 152/158 may comprise washing solvent and/or solvent 114 at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the particles 138/144.

Emulsion stabilizers 104 may be present in the microparticles 152/158 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the microparticles 152/158. When purified to at least substantially remove emulsion stabilizers, the emulsion stabilizers 104 may be present in the microparticles 156 at less than 0.01 wt % (or 0 wt % to about 0.01 wt %, or 0 wt % to 0.001 wt %).

Polyamide microparticles 152/158 may have a D10 of about 0.5 µm to about 125 µm, a D50 of about 1 µm to about 200 µm, and a D90 of about 70 µm to about 300 µm, wherein D10<D50<D90. The microparticles 138/144 may also have a diameter span of about 0.2 to about 10 (or about 0.2 to about 0.5, or about 0.4 to about 0.8, or about 0.5 to about 1.0, or about 1 to about 3, or about 2 to about 5, or about 5 to about 10). Without limitation, diameter span values of 1.0 or greater are considered broad, and diameter spans values of 0.75 or less are considered narrow.

Polyamide microparticles 152/158 may have a circularity of about 0.8 or greater (or about 0.8 to about 1, or about 0.80 to about 0.95, or about 0.90 to about 1.0, or about 0.93 to about 0.99, or about 0.95 to about 0.99, or about 0.97 to about 0.99, or about 0.98 to about 1.0).

The particles 152/158 may have an angle of repose of about 22° to about 50° (or about 22° to about 30°, or about 25° to about 35°, or about 30° to about 40°, or about 35° to about 45°, or about 40° to about 50°).

The particles 152/158 may have a Hausner ratio of about 1.0 to about 1.5 (or about 1.0 to about 1.2, or about 1.1 to about 1.3, or about 1.2 to about 1.35, or about 1.3 to about 1.5).

The particles 152/158 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

Depending on the temperature and shear rate of processing 142 and the composition and relative concentrations of the components, different shapes of the structures that compose the polyamide microparticles 152/158 have been observed. Typically, the polyamide microparticles 152/158 comprise substantially spherical particles (having a circularity of about 0.90 or greater). However, other structures, including disc and elongated structures, have been observed in the polyamide microparticles 152/158. Therefore, the polyamide microparticles 152/158 may comprise one or more of: (a) substantially spherical particles having a circularity of 0.90 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

Applications of Thermoplastic Polyamide Microparticles

The polyamide microparticles described herein may be utilized in 3-D print processes, particularly those employing selective laser sintering to promote particulate consolidation. The polyamide microparticles of the present disclosure may exhibit advantageous properties over polymer particulates having irregular shapes or wider particulate distributions, such as those available commercially. In nonlimiting examples, the polyamide microparticles of the present disclosure may undergo consolidation at lower laser powers and afford a decreased extent of void formation in an object produced by 3-D printing.

3-D printing processes of the present disclosure may comprise: depositing polyamide microparticles of the present disclosure upon a surface in a specified shape, and once deposited, heating at least a portion of the polyamide microparticles to promote consolidation thereof and form a consolidated body (object), such that the consolidated body has a void percentage of about 1% or less after being consolidated. For example, heating and consolidation of the polyamide microparticles may take place in a 3-D printing apparatus employing a laser, such that heating and consolidation take place by selective laser sintering.

Any of the polyamide microparticles disclosed herein may be formulated in a composition suitable for 3-D printing. Choice of the composition may be based upon various factors such as, but not limited to, the laser power used for selective laser sintering, the type of object being produced, and the intended use conditions for the object.

Examples of objects that may be 3-D printed using the polyamide microparticles of the present disclosure include, but are not limited to, containers (e.g., for food, beverages, cosmetics, personal care compositions, medicine, and the like), shoe soles, toys, furniture parts and decorative home goods, plastic gears, screws, nuts, bolts, cable ties, automotive parts, medical items, prosthetics, orthopedic implants, aerospace/aircraft-related parts, production of artifacts that aid learning in education, 3D anatomy models to aid in surgeries, robotics, biomedical devices (orthotics), home appliances, dentistry, electronics, sporting goods, and the like.

Other applications for the polyamide microparticles of the present disclosure may include, but are not limited to, use as a filler in paints and powder coatings, inkjet materials and electrophotographic toners, and the like. In some instances, the polyamide microparticles may have other preferred characteristics like diameter and span to be useful in said other applications.

Clauses

Clause 1. A method of synthesizing polyamide microparticles comprising: dehydrating and shearing a mixture comprising a matrix fluid, an emulsion stabilizer, a solvent, and a cyclic amide monomer to yield an emulsion having a water content of about 1 wt % or less based on the total weight of the emulsion; adding a deprotonating agent to the emulsion at a concentration of about 0.01 wt % to about 1 wt % based on the weight of the matrix fluid; adding a polymerization initiator to the emulsion; and polymerizing the cyclic amide monomer into a plurality of polyamide microparticles.

Clause 2. The method Clause 1, wherein the emulsion stabilizer is at about 0.01 wt % to about 50 wt % based on the weight of the matrix fluid, Clause 3. The method of any preceding Clause, wherein the solvent at about 13 wt % to about 75 wt % based on the weight of the matrix fluid.

Clause 4. The method of any preceding Clause, wherein the cyclic amide monomer at about 20 wt % to about 90 wt % based on the weight of the matrix fluid.

Clause 5. The method Clause 1 or Clause 2 or Clause 3 or Clause 4, wherein adding the deprotonating agent is before adding the polymerization initiator.

Clause 6. The method Clause 1 or Clause 2 or Clause 3 or Clause 4, wherein adding the deprotonating agent is after adding the polymerization initiator.

Clause 7. The method Clause 1 or Clause 2 or Clause 3 or Clause 4, wherein adding the deprotonating agent is at the same time as adding the polymerization initiator.

Clause 8. The method of any preceding Clause, wherein the cyclic amide monomer is selected from the group consisting of azeridinone, 2-azetidinone, 2-pyrrolidinone, 2-piperidinone, ε-caprolactam, 2-azacyclooctanone, 2-azacyclononanone, 2-azacyclodecanone, 2-azacycloundecanone, 2-aza-cyclododecanone, laurolactam, and any combination thereof.

Clause 9. The method of any preceding Clause, wherein the polyamide of the polyamide microparticles is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10.10, nylon 10.12, nylon 10.14, nylon 10.18, nylon 6.10, nylon 6.18, nylon 6.12, nylon 6.14, and any copolyamide thereof.

Clause 10. The method of any preceding Clause, wherein the matrix fluid comprises one selected from the group consisting of: polysiloxanes modified with fatty acids, polysiloxanes modified with fatty alcohols, polysiloxanes modified with polyoxy alkylenes, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, silicone oil, fluorinated silicone oils, perfluorinated silicone oils, polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, and fatty alcohols, and any combination thereof.

Clause 11. The method of any preceding Clause, wherein the emulsion stabilizer comprises nanoparticles and/or surfactant.

Clause 12. The method of Clause 11, wherein the nanoparticles comprise oxide nanoparticles, carbon black, and/or polymer nanoparticles.

Clause 13. The method of Clause 11 or Clause 12, wherein the nanoparticles are associated with an outer surface of the polyamide microparticles.

Clause 14. The method of Clause 11 or Clause 12 or Clause 13, wherein at least a portion of the nanoparticles are embedded in an outer surface of the polyamide microparticles.

Clause 15. The method of Clause 11 or Clause 12 or Clause 13 or Clause 14, wherein the surfactant comprises one selected from the group consisting of: a sorbitan oleate, poly[dimethylsiloxane]-co-[3-(2-(2-hydroxyethoxy)ethoxy) propylmethylsiloxane], a sulfate, a sulfonate, a dialkyl benzenealkyl sulfate, a dialkyl benzenealkyl sulfonate, an acid, an alcohol, an acid, an ether, methalose, methyl cellulose, ethyl cellulose, propyl cellulose, hydroxyl ethyl cellulose, carboxy methyl cellulose, ammoniums (e.g., alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride), C12 trimethyl ammonium bromide, C15 trimethyl ammonium bromide, C17 trimethyl ammonium bromide, cetyl pyridinium bromide, a halide salt of a quaternized polyoxyethylalkylamine, dodecylbenzyl triethyl ammonium chloride, and any mixture thereof.

Clause 16. The method of any preceding Clause, wherein the solvent has a boiling point greater than about 150° C.

Clause 17. The method of any preceding Clause e, wherein the solvent comprises one selected from the group consisting of: decahydronaphthalene, bicyclohexane, phenylcyclohexane, butylcyclohexane, propylbenzene, butylbenzene, pentylbenzene, hexylbenzene, heptylbenzene, 1-phenyl-1-cyclohexene, 3-cyclohexen-1-ylbenzene, decane, dodecane, tridecane, tetradecane, pentadecane, heptadecane, hexadecane, propylcyclohexane, 4-phenyl-1-cyclohexene, 1-phenyloctane, octanophenone, 1-phenylnonane, 1-phenyldecane, 1-phenylundecane, 1-phenyldodecane, 1-phenyltridecane, 1-phenyltetradecane, 1-phenylheptadecane, 1-phenyloctadecane, 1,4-didodecylbenzene, 1,4-bis(2-ethylhexyl)benzene, eicosane, triacontane, and any combination thereof.

Clause 18. The method of any preceding Clause, wherein the dehydrating is performed by heating the mixture to a temperature of about 100° C. to about 300° C. at a pressure of about 1 Pa to about 150 Pa.

Clause 19. The method of any preceding Clause, wherein the dehydrating is performed such that about 10% to about 15% of the solvent is distilled off during the dehydrating.

Clause 20. The method of any preceding Clause, wherein the polymerization initiator comprises one selected from the group consisting of: toluene diisocyanate (TDI), methylene diphenyl diisocyate (MDI), and any combination thereof.

Clause 21. The method of any preceding Clause, wherein the deprotonating agent comprises a Group I and Group II metal hydroxide, a Group I and Group II metal hydride, potassium methoxide, sodium methoxide, potassium ethoxide, sodium ethoxide, lithium ethoxide, potassium t-butoxide, sodium t-butoxide, lithium t-butoxide, sodium caprolactamates, ε-caprolactam magnesium bromides, sodium dicaprolactamato-bis-(2-methoxyethoxo)-aluminate, and any combination thereof.

Clause 22. The method of any preceding Clause further comprising: washing the polyamide microparticles.

Clause 23. The method of Clause 22, wherein the washing is performed with n-heptane, n-hexane, ethyl acetate, methanol, or any combination thereof.

Clause 24. The method of any preceding Clause, wherein the polyamide microparticles have a D10 of about 0.5 μm to about 125 μm, a D50 of about 1 μm to about 200 μm, and a D90 of about 70 μm to about 300 μm, wherein D10<D50<D90.

Clause 25. The method of any preceding Clause, wherein the polyamide microparticles have a diameter span of about 0.2 to about 10.

Clause 26. The method of any preceding Clause, wherein the polyamide microparticles have a circularity of about 0.8 or greater.

Clause 27. The method of any preceding Clause, wherein the polyamide microparticles have an angle of repose of about 22° to about 50°.

Clause 28. The method of any preceding Clause, wherein the polyamide microparticles have a Hausner ratio of about 1.0 to about 1.5.

Clause 23. The method of any preceding Clause, wherein the polyamide microparticles have a bulk density of about 0.3 g/cm$^3$ to about 0.8 g/cm$^3$.

Clause 24. A method of synthesizing polyamide microparticles comprising: dehydrating and shearing a mixture comprising a matrix fluid, an emulsion stabilizer at about 0.01 wt % to about 50 wt % based on the weight of the matrix fluid, and a solvent at about 13 wt % to about 75 wt % based on the weight of the matrix fluid; adding while shearing a cyclic amide monomer at about 20 wt % to about 90 wt % based on the weight of the matrix fluid to the mixture to yield an emulsion; dehydrating the emulsion to a water content of about 1 wt % or less based on the total weight of the emulsion to yield a dehydrated emulsion; adding a deprotonating agent to the dehydrated emulsion at a concentration of about 0.01 wt % to about 1 wt % based on the weight of the matrix fluid; and contacting the dehydrated emulsion with a polymerization initiator under conditions effective to polymerize the cyclic amide monomer into a plurality of polyamide microparticles. One or more of Clauses 5-23 may also be combined with Clause 24.

Clause 25. A method of synthesizing polyamide microparticles comprising: dehydrating and shearing a mixture comprising a matrix fluid, an emulsion stabilizer at about 0.01 wt % to about 50 wt % based on the weight of the matrix fluid, and a solvent at about 13 wt % to about 75 wt % based on the weight of the matrix fluid, wherein the emulsion stabilizer comprises nanoparticles; adding while shearing a cyclic amide monomer at about 20 wt % to about 90 wt % based on the weight of the matrix fluid to the mixture to yield an emulsion; dehydrating the emulsion to a water content of about 1 wt % or less based on the total weight of the emulsion to yield a dehydrated emulsion; adding a deprotonating agent to the dehydrated emulsion at a concentration of about 0.01 wt % to about 1 wt % based on the weight of the matrix fluid; and contacting the dehydrated emulsion with a polymerization initiator under conditions effective to polymerize the cyclic amide monomer into a plurality of polyamide microparticles, wherein the nanoparticles are associated with an outer surface of the polyamide microparticles. One or more of Clauses 5-11 and 14-23 may also be combined with Clause 25. The emulsion stabilizer may further comprise surfactants (e.g., the surfactants of Clause 15).

To facilitate a better understanding of the embodiments of the present invention, the following examples of preferred or representative embodiments are given. In no way should the following examples be read to limit, or to define, the scope of the invention.

EXAMPLES

Example 1

Polyamide microparticles comprising Nylon 12 ("Ny12") were prepared by combining PDMS and polyoxyethylene (9) nonyphenylether (IGEPAL™ CS-360) and vacuum drying the combined mixture. Decahydronaphthalene (DECALIN™) was then added and the combined mixture was vacuum dried. Laurolactam ("LL") was added under vacuum, followed by a deprotonating agent to deprotonate a portion of the laurolactam. The vacuum was broken and replaced by a slow stream of inert gas. The reaction mixture was agitated while several aliquots of AROP (aromatic ring opening polymerization) initiator was added gradually (at 30 minute time intervals). The reaction mixture was cooled and spherical Ny12 microparticles were washed with n-hexane, ethyl acetate, and methanol, sequentially. Ny12 microparticles were dried in an oven overnight at 80° C. Table 1 lists various non-limiting example reaction conditions that are suitable for preparing the polyamide microparticles of the present disclosure.

TABLE 1

| Reaction # | 1 | 2 | 3 | 4 |
|---|---|---|---|---|
| PDMS Oil Viscosity | 30,000 cSt | 10,000 cSt | 10,000 cSt | 10,000 cSt |
| PDMS:LL | 1:1 | 3:1 | 3:1 | 3:1 |
| Drying Time/Temp. | 5 hours/155° C. | 5 hours/145° C. | 5 hours/145° C. | 5 hours/145° C. |
| PDMS:surfactant:DECALIN™ | 4:1:2 | 4:1:2 | 4:1:2 | 4:0.5:2 |
| Polymerization Temp. | 165° C. | 160° C. | 160° C. | 160° C. |
| Reaction Time | 4 hours | 3.5 hours | 3.5 hours | 3.5 hours |
| RPM | 450 | 600 | 600 | 600 |

Figure 2:
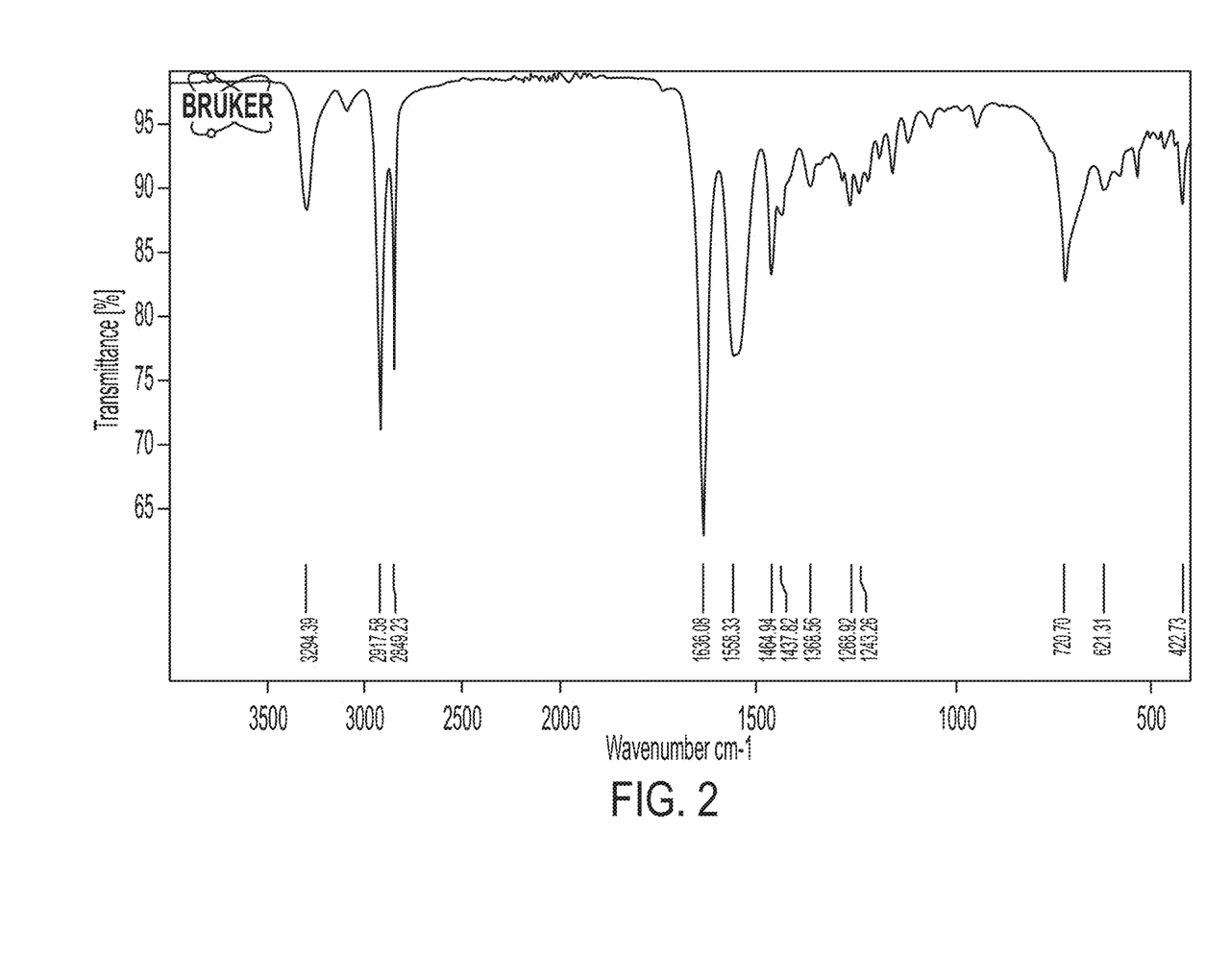
FIG. 2 is an FT-IR spectrum of polyamide microparticles of the present disclosure.

The chemical structure of the obtained polyamide microparticles was confirmed by FTIR spectroscopy. An example FTIR spectrum is shown in FIG. 2. The eminent carbonyl and amide N—H stretching absorption peaks appearing at 1636 $cm^{-1}$ and 3264 $cm^{-1}$, respectively, confirm polyamide.

As discussed in the disclosure, residual PDMS oil may be present in the polyamide microparticles. Silicon measurement by inductively coupled plasma (ICP) was used to determine PDMS oil remaining after the described washing procedure. Based on ICP results, 762 ppm of silicon remained in a sample of Ny12 microparticles, which may represent a rough estimation of silicon oil contained in the sample. The calculation shows that there is 2.0 g of silicon oil in 1000 g of polymer sample, which may be on the surface of microparticles or may be trapped inside them.

Figure 3:
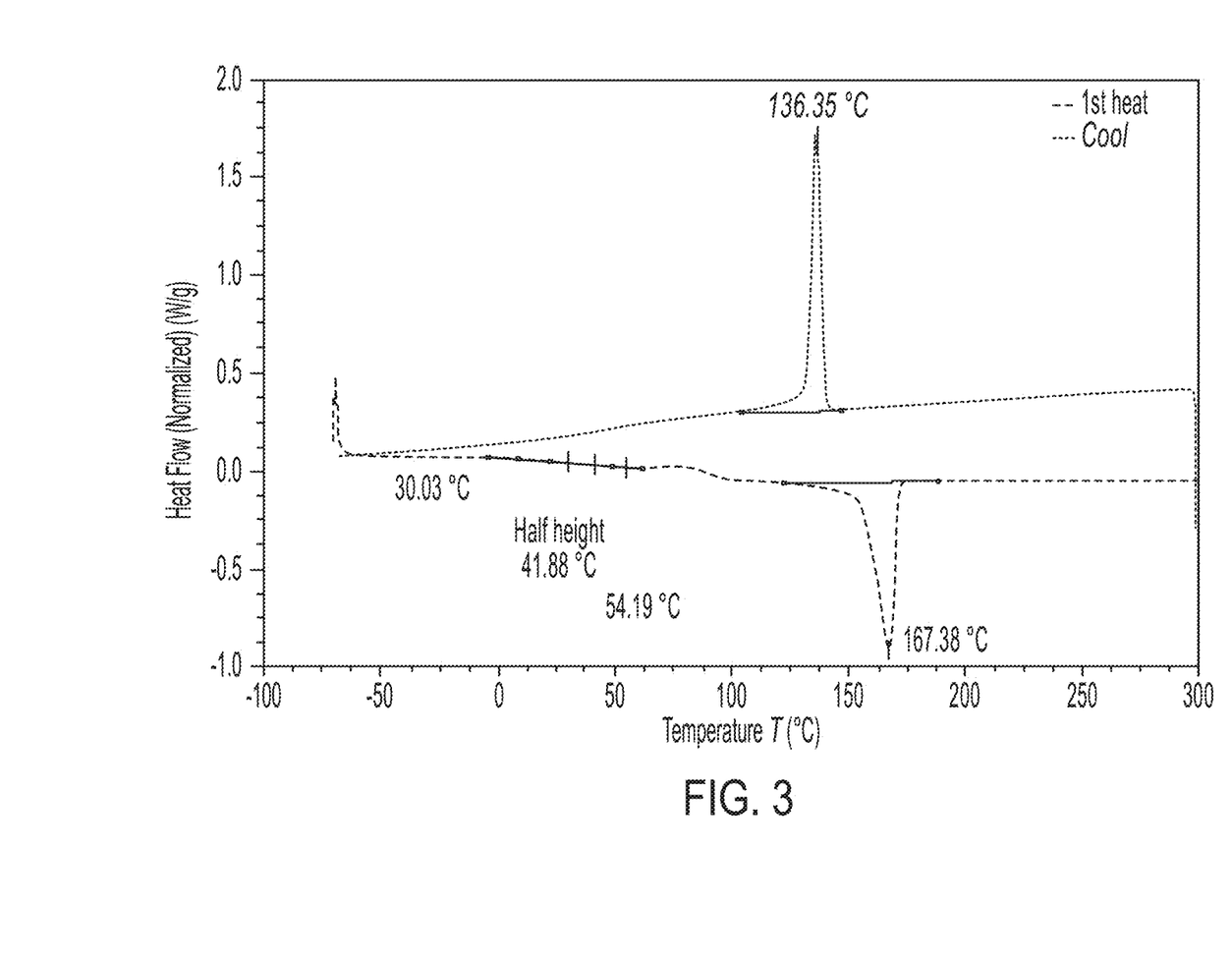
FIG. 3 is a differential scanning calorimeter (DSC) trace for polyamide microparticles produced according to the methods of the present disclosure.

Samples of the polyamide microparticles were also analyzed by differential scanning calorimetry (DSC). A typical DSC scan of obtained Ny12 is shown in FIG. 3.

Example 2

PDMS (16.0 grams, 30,000 cSt, from Clearco Product Inc, USA) and 4.0 grams IGEPAL™ CO-630 (non-ionic emulsifier; polyoxyethylene (9) nonylphenylether from Sigma-Aldrich) were combined in a reactor. The reactor was vacuum-sealed while stirring at 250 RPM at 170° C. for one hour. Then, 8.0 grams of DECALIN™ was added and vacuum-dried for one more hour at the same RPM. The temperature remained at 143° C. to 145° C. The temperature set-point was tuned according to the reaction scale and reactor size to distill-off 10-15% of DECALIN™. Then, 11.24 grams laurolactam was added and vacuum-dried for 45 minutes at 155° C. and 550-600 RPM agitation. Finally, 0.05 grams of sodium hydroxide was added and continued vacuum-drying for 15 minutes at the same temperature/agitation conditions. Then vacuum was broken and a slow flow of nitrogen was introduced while the system reached 160° C. with steady stirring at 600 RPM. The oil-in-oil melt emulsion system was ready to initiate AROP by dropwise addition of TDI as the activator. 200 μL of TDI was divided into 4 equal portions that were added slowly (about 2 minutes) with a time interval of 30 minutes between each portion and rigorous agitation at 600 RPM. The system was kept at 160° C. for 3 hours after the last aliquot of TDI was added and then discharged onto an aluminum plate containing dry ice for fast cooling. Washing was done with n-hexane (three times), ethyl acetate and methanol (three times) to remove PDMS, impurities and unreacted monomers. The resulting material was an off-white powder that was dried at 80° C. overnight.

Figure 4A:
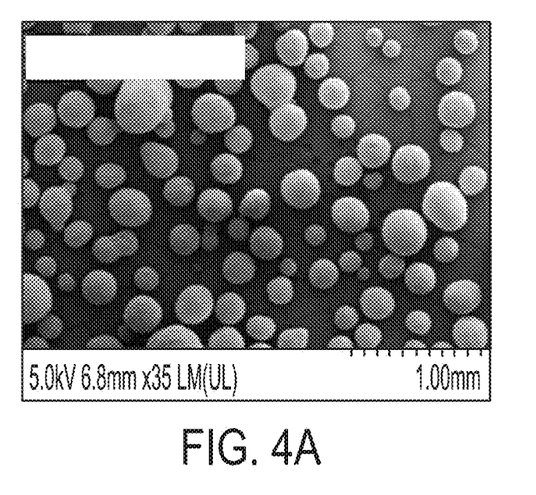
FIGS. 4A and 4B are two scanning electron micrographs of polyamide microparticles, produced according to the methods of the present disclosure.
Figure 4B:
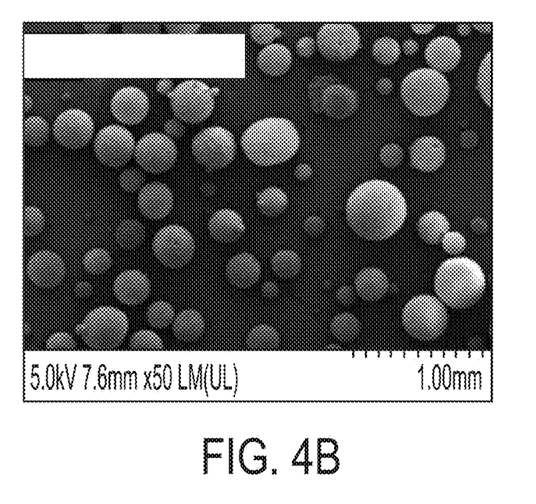

FIGS. 4A and 4B are two scanning electron micrographs of polyamide microparticles produced in Example 2.

Example 3

PDMS (16.0 grams, 30,000 cSt, from Clearco Product Inc, USA) and 4.0 grams IGEPAL™ CO-630 (non-ionic emulsifier; polyoxyethylene (9) nonylphenylether from Sigma-Aldrich) were combined in a reactor. The reactor was vacuum-sealed while stirring at 250 RPM at 170° C. for one hour. Then 8.0 grams DECALIN™ was added and vacuum-dried for one more hour at the same RPM. The temperature remained at 143° C. to 145° C. due to the solvent refluxing. The temperature set-point had to be tuned according to the reaction scale and reactor size to distill-off 10-15% of DECALIN™. Then 11.19 grams laurolactam was added and vacuum-dried for 45 minutes at 155° C. and 550-600 RPM agitation. Finally 0.08 grams of sodium hydroxide was added and continued vacuum-drying for 15 minutes at the same temperature/agitation conditions. Then vacuum was broken and a slow flow of nitrogen was introduced while the system reached 160° C. with steady stirring at 600 RPM. The oil-in-oil melt emulsion system was ready to initiate AROP by dropwise addition of TDI as the activator. 200 μL of TDI was divided into 4 equal portions that were added slowly (~2 minutes) with a time interval of 30 minutes between each portion and rigorous agitation at 600 RPM. The system was kept at 160° C. for 3 hours after the last aliquot of TDI was added and then discharged onto an aluminum plate containing dry ice for fast cooling. Washing was done with n-hexane (three times), ethyl acetate and methanol (three times) to remove PDMS, impurities and unreacted monomers. The resulting material was an off-white powder that was dried at 80° C. overnight.

Example 4

PDMS (33.9 grams, 10,000 cSt, from Clearco Product Inc, USA) and 4.23 grams IGEPAL™ CO-630 (non-ionic emulsifier; polyoxyethylene (9) nonylphenylether from Sigma-Aldrich) were combined in a reactor. The reactor was vacuum-sealed while stirring at 250 RPM at 170° C. for one hour. Then 12.08 grams DECALIN™ was added and vacuum-dried for one more hour at the same RPM. The temperature remained at 143° C. to 145° C. due to the solvent refluxing. The temperature set-point had to be tuned according to the reaction scale and reactor size to distill-off 10-15% of DECALIN™. Then 12.88 grams laurolactam was added and vacuum-dried for 45 minutes at 155° C. and 550-600 RPM agitation. Finally 0.06 grams of sodium hydroxide was added and continued vacuum-drying for 15 minutes at the same temperature/agitation conditions. Then vacuum was broken and a slow flow of nitrogen was introduced while the system reached 160° C. with steady stirring at 600 RPM. The oil-in-oil melt emulsion system was ready to initiate AROP by dropwise addition of TDI as the activator. 250 μL of TDI was divided into 5 equal portions that were added slowly (~2 minutes) with a time interval of 30 minutes between each portion and rigorous agitation at 600 RPM. The system was kept at 160° C. for 3 hours after the last aliquot of TDI was added and then discharged onto an aluminum plate containing dry ice for fast cooling. Washing was done with n-hexane (three times), ethyl acetate and methanol (three times) to remove PDMS, impurities and unreacted monomers. The resulting off-white powder was dried at 80° C. overnight.

Example 5

PDMS (20.6 grams, 10,000 cSt, from Clearco Product Inc, USA) and 0.6 grams IGEPAL™ CO-630 (non-ionic emulsifier; polyoxyethylene (9) nonylphenylether from Sigma-Aldrich) were combined in a reactor. The reactor was vacuum-sealed while stirring at 250 RPM at 170° C. for one hour. Then 10.3 grams DECALIN™ was added and vacuum-dried for one more hour at the same RPM. The temperature remained at 143-145° C. due to the solvent refluxing. The temperature set-point had to be tuned according to the reaction scale and reactor size to distill-off 10-15% of DECALIN™. Then 11.0 grams laurolactam was added and vacuum-dried for 45 minutes at 155° C. and 550-600 RPM agitation. Finally 0.07 grams of sodium hydroxide was added and continued vacuum-drying for 15 minutes at the same temperature/agitation conditions. Then vacuum was broken and a slow flow of nitrogen was introduced while the system reached 160° C. with steady stirring at 600 RPM. The oil-in-oil melt emulsion system was ready to initiate AROP by dropwise addition of TDI as the activator. 25 μL of TDI was divided into 5 equal portions that were added slowly (~2 minutes) with a time interval of 30 minutes between each portion and rigorous agitation at 600 RPM. The system was kept at 160° C. for 3 hours after the last aliquot of TDI was added and then discharged onto an aluminum plate containing dry ice for fast cooling. Washing was done with n-hexane (three times), ethyl acetate and methanol (three times) to remove PDMS, impurities and unreacted monomers. The resulting off-white powder was dried at 80° C. overnight.

All documents described herein are incorporated by reference herein for purposes of all jurisdictions where such practice is allowed, including any priority documents and/or testing procedures to the extent that they are not inconsistent with this text. As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed:

1. A method of synthesizing polyamide microparticles comprising:
    dehydrating and shearing a mixture comprising a matrix fluid, an emulsion stabilizer, a solvent, and a cyclic amide monomer to yield an emulsion having a water content of about 1 wt % or less based on the total weight of the emulsion;
    adding a deprotonating agent to the emulsion at a concentration of about 0.01 wt % to about 1 wt % based on the weight of the matrix fluid;
    adding a polymerization initiator to the emulsion; and
    polymerizing the cyclic amide monomer into a plurality of polyamide microparticles, wherein the polyamide microparticles have a diameter span of about 0.2 to about 10.

2. The method claim 1, wherein the emulsion stabilizer is at about 0.01 wt % to about 50 wt % based on the weight of the matrix fluid.

3. The method claim 1, wherein the solvent at about 13 wt % to about 75 wt % based on the weight of the matrix fluid.

4. The method claim 1, wherein the cyclic amide monomer at about 20 wt % to about 90 wt % based on the weight of the matrix fluid.

5. The method claim 1, wherein adding the deprotonating agent is before adding the polymerization initiator.

6. The method claim 1, wherein adding the deprotonating agent is after adding the polymerization initiator.

7. The method claim 1, wherein adding the deprotonating agent is at the same time as adding the polymerization initiator.

8. The method of claim 1, wherein the cyclic amide monomer is selected from the group consisting of azeridinone, 2-azetidinone, 2-pyrrolidinone, 2-piperidinone, ε-caprolactam, 2-azacyclooctanone, 2-azacyclononanone, 2-azacyclodecanone, 2-azacycloundecanone, 2-aza-cyclododecanone, laurolactam, and any combination thereof.

9. The method of claim 1, wherein the polyamide of the polyamide microparticles is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10.10, nylon 10.12, nylon 10.14, nylon 10.18, nylon 6.10, nylon 6.18, nylon 6.12, nylon 6.14, and any copolyamide thereof.

10. The method of claim 1, wherein the matrix fluid comprises one selected from the group consisting of: polysiloxanes modified with fatty acids, polysiloxanes modified with fatty alcohols, polysiloxanes modified with polyoxy alkylenes, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, silicone oil, fluorinated silicone oils, perfluorinated silicone oils, polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, and fatty alcohols, and any combination thereof.

11. The method of claim 1, wherein the solvent has a boiling point greater than about 150° C.

12. The method of claim 1, wherein the dehydrating is performed such that about 10% to about 15% of the solvent is distilled off during the dehydrating.

13. The method of claim 1, wherein the polymerization initiator comprises one selected from the group consisting of: toluene diisocyanate (TDI), methylene diphenyl diisocyate (MDI), and any combination thereof.

14. The method of claim 1, wherein the deprotonating agent comprises a Group I and Group II metal hydroxide, a Group I and Group II metal hydride, potassium methoxide, sodium methoxide, potassium ethoxide, sodium ethoxide, lithium ethoxide, potassium t-butoxide, sodium t-butoxide, lithium t-butoxide, sodium caprolactamates, ε-caprolactam magnesium bromides, sodium dicaprolactamato-bis-(2-methoxyethoxo)-aluminate, and any combination thereof.

15. The method of claim 1 further comprising:
washing the polyamide microparticles.

16. The method of claim 1, wherein the polyamide microparticles have a D10 of about 0.5 µm to about 125 µm, a D50 of about 1 µm to about 200 µm, and a D90 of about 70 µm to about 300 µm, wherein D10<D50<D90.

17. The method of claim 1, wherein the polyamide microparticles have a circularity of about 0.8 or greater.

18. A method of synthesizing polyamide microparticles comprising:
dehydrating and shearing a mixture comprising a matrix fluid, an emulsion stabilizer, a solvent, and a cyclic amide monomer to yield an emulsion having a water content of about 1 wt % or less based on the total weight of the emulsion;
adding a deprotonating agent to the emulsion at a concentration of about 0.01 wt % to about 1 wt % based on the weight of the matrix fluid;
adding a polymerization initiator to the emulsion; and
polymerizing the cyclic amide monomer into a plurality of polyamide microparticles, wherein the polyamide microparticles have a D10 of about 0.5 µm to about 125 µm, a D50 of about 1 µm to about 200 µm, and a D90 of about 70 µm to about 300 µm, wherein D10<D50<D90.

19. A method of synthesizing polyamide microparticles comprising:
dehydrating and shearing a mixture comprising a matrix fluid, an emulsion stabilizer, a solvent, and a cyclic amide monomer to yield an emulsion having a water content of about 1 wt % or less based on the total weight of the emulsion;
adding a deprotonating agent to the emulsion at a concentration of about 0.01 wt % to about 1 wt % based on the weight of the matrix fluid;
adding a polymerization initiator to the emulsion; and
polymerizing the cyclic amide monomer into a plurality of polyamide microparticles, wherein the polyamide microparticles have a circularity of about 0.8 or greater.

* * * * *